March 8, 1955 R. I. STROUGH ET AL 2,703,864
EDDY-CURRENT COMPENSATOR.
Filed June 28, 1944
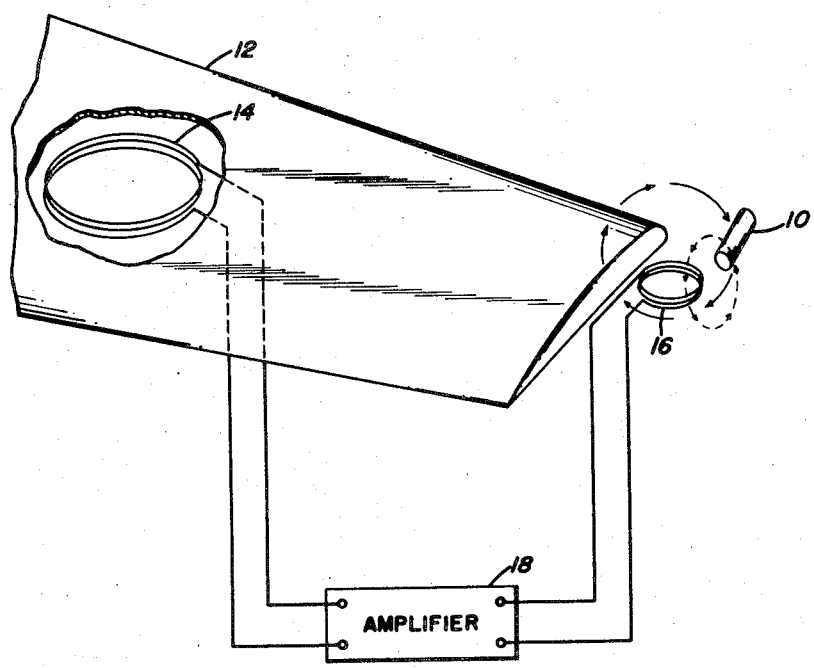
INVENTORS
ROBERT I. STROUGH
HARRY N. JACOBS
BY
ATTORNEYS

United States Patent Office 2,703,864
Patented Mar. 8, 1955

2,703,864

EDDY-CURRENT COMPENSATOR

Robert I. Strough and Harry N. Jacobs, Garden City, N. Y., assignors to the United States of America as represented by the Secretary of the Navy Application June 28, 1944, Serial No. 542,588

3 Claims. (Cl. 324—43)

This invention relates to systems for compensating the magnetic field produced by eddy currents flowing in a finite conducting sheet at a given point in relation to the sheet.

When magnetic instruments, such as magnetometers, are mounted in carriers constructed of large sheets of metal, as for example in metal-skinned aircraft, their operation is in many cases adversely affected by magnetic fields due to eddy currents flowing in the metallic skin of the aircraft. Such currents are caused to flow in finite conducting sheets, such as the metal skin of an aircraft wing, by the E. M. F.'s induced in the sheet whenever the total magnetic flux therethrough is changed. Such changes in the total flux occur whenever the aircraft performs maneuvers in the earth's magnetic field as in banking or the like. The magnitude and distribution of the field due to such currents depend upon the shape of the conducting sheet and the extent of its motion in relation to the earth's magnetic field. At the location of any particular magnetic instrument mounted in the carrier, however, the direction and magnitude of the eddy-current field for a particular maneuver may readily be determined.

It is an object of the present invention to compensate the eddy-current field at the location of the magnetic instrument in question by producing, without the use of large compensating sheets or other bulky equipment, a field which at all times opposes and is of proper magnitude to cancel the eddy-current field at that location.

Referring to the acompanying drawing, a magnetic instrument indicated schematically at 10 is mounted at the tip of a metal-skinned aircraft wing 12. Whenever the aircraft banks or so otherwise maneuvers as to change the total flux through the metal skin of the wing, eddy-currents are induced therein which result in the production of a magnetic field, the direction of which is shown arbitrarily by the solid arrows in the drawing. This magnetic field threads magnetic instrument 10 and will obviously affect its operation.

According to the invention, therefore, a pickup coil 14 having a high $N \times A$ product (where N is the number of coil turns and A is the area of the turns) is mounted substantially parallel to the plane of the conducting sheets forming the wing covering. While this pickup coil is shown as mounted within the wing, it may equally well be mounted in any convenient place adjacent the wing. As the flux through the metal skin of the wing changes, so also does the flux threading pickup coil 14. An E. M. F. proportional to the magnitude of the eddy-current field of the wing is, therefore, induced in the pickup coil.

A second coil 16, having an $N \times A$ product considerably smaller than that of pickup coil 14, is mounted at the wing tip adjacent the point at which the eddy-current field is to be compensated. The E. M. F. induced in coil 14 is applied to coil 16 in such manner that it tends to oppose the E. M. F. induced in the latter coil as the flux threading the entire system varies. Since the E. M. F. induced in coil 14 is considerably larger than that induced in coil 16, for a given change in flux threading the system, current flows in the same direction in both of these coils. It will be understood, therefore, that a magnetic field opposing the eddy-current field will be produced at the location of magnetic instrument 10 by coil 16, and that this field will vary in magnitude in the same manner as the eddy-current field.

In order to obtain complete compensation by the system thus far described, coil 16 must have either a very large number of turns or a very large area. These limitations exist even when a ferromagnetic core is used in compensating coil 16, although in this case the field produced by that coil may be sufficient for compensation purposes in some applications.

It is proposed, however, in accordance with the invention, to increase the compensating field available through the use of a conventional low-frequency amplifier 18, connected in the system between pickup coil 14 and compensating coil 16. Amplifier 18, which is preferably two-sided, must have a balanced output. This output must remain substantially balanced under all conditions, since there must be no appreciable output signal from the amplifier to compensating coil 16 when there is no input to the amplifier from pickup coil 14.

What is claimed is:

1. Apparatus for neutralizing that component of the total magnetic field at a given point in a magnetically responsive instrument which component is due to the eddy currents in a finite conducting sheet fixed in predetermined relation to said instrument, the eddy currents being caused by changes in the ambient magnetic field threading said sheet, said apparatus comprising a pickup device fixedly mounted adjacent said sheet and arranged to be threaded at all times by the same vectorial component of the ambient field which threads said sheet, a compensating coil positioned in inductive relation to said instrument so that its magnetic field at the instrument is in line with the eddy-current component of the magnetic field at that point, and means controlled by the E. M. F. induced in the pickup device for exciting said coil in the proper polarity and at the proper intensity to neutralize and compensate said eddy-current component in said instrument.

2. Apparatus according to claim 1 wherein said pickup device comprises a coil the axis of which is perpendicular to said sheet.

3. Apparatus according to claim 1 wherein said exciting means comprises an adjustable amplifier.

References Cited in the file of this patent

UNITED STATES PATENTS

| Number | Name | Date |
|---|---|---|
| 1,360,326 | Slepian | Nov. 30, 1920 |
| 1,892,826 | Bettison et al. | Jan. 3, 1933 |
| 2,054,318 | Gunn | Sept. 15, 1936 |
| 2,241,499 | Barth | May 13, 1941 |
| 2,255,053 | Gunn | Sept. 9, 1941 |
| 2,267,838 | Polin | Dec. 30, 1941 |
| 2,324,718 | Noxon | July 20, 1943 |